United States Patent
Blach

(10) Patent No.: US 8,783,939 B2
(45) Date of Patent: Jul. 22, 2014

(54) EXTRUDER

(75) Inventor: Josef A. Blach, Ehrwald (AT)

(73) Assignee: Blach Verwaltungs GmbH & Co. KG, Lauffen (DE)

( * ) Notice: Subject to any disclaimer, the term of this patent is extended or adjusted under 35 U.S.C. 154(b) by 43 days.

(21) Appl. No.: 13/383,701

(22) PCT Filed: Jul. 16, 2009

(86) PCT No.: PCT/EP2009/005162
§ 371 (c)(1),
(2), (4) Date: Apr. 10, 2012

(87) PCT Pub. No.: WO2011/006516
PCT Pub. Date: Jan. 20, 2011

(65) Prior Publication Data
US 2012/0188840 A1    Jul. 26, 2012

(51) Int. Cl.
*B01F 7/24*    (2006.01)

(52) U.S. Cl.
USPC ............................................................. 366/85

(58) Field of Classification Search
USPC ......... 366/74.6, 85, 76.6, 79, 76.4, 82, 83, 84
See application file for complete search history.

(56) References Cited

U.S. PATENT DOCUMENTS

| | | | |
|---|---|---|---|
| 4,015,833 A | 4/1977 | Kim | |
| 4,300,839 A | 11/1981 | Sakagami | |
| 4,824,256 A | 4/1989 | Haring et al. | |
| 5,000,900 A * | 3/1991 | Baumgartner | 264/211.23 |
| 5,597,235 A * | 1/1997 | Barnes et al. | 366/76.6 |
| 7,270,471 B2 | 9/2007 | Blach | |
| 8,172,450 B2 | 5/2012 | Blach | |
| 8,434,928 B2 | 5/2013 | Blach | |
| 2005/0041521 A1 | 2/2005 | Herter | |
| 2005/0084559 A1* | 4/2005 | Blach | 425/208 |
| 2011/0110183 A1 | 5/2011 | Bierdel et al. | |
| 2011/0141843 A1 | 6/2011 | Bierdel et al. | |
| 2013/0259966 A1 | 10/2013 | Blach | |

FOREIGN PATENT DOCUMENTS

| | | |
|---|---|---|
| CA | 2728438 A1 | 12/2009 |
| DE | 862668 C | 1/1953 |
| DE | 3123699 A1 | 4/1982 |
| DE | 10207145 A1 | 9/2003 |
| DE | 10233213 | 2/2004 |

(Continued)

OTHER PUBLICATIONS

International Search Report dated Aug. 26, 2010 corresponding to International Patent Application No. PCT/EP09/05162.

(Continued)

*Primary Examiner* — Tony G Soohoo
*Assistant Examiner* — Anshu Bhatia
(74) *Attorney, Agent, or Firm* — Thompson Coburn LLP

(57) ABSTRACT

An extruder is provided that has a housing with at least two axially parallel shafts which are capable of being driven in the same direction and with at least two-flight intermeshing conveying elements stripping each other at an axial distance (Ax) with a small clearance over the entire circumference. The extruder has a distance between the comb of the at least one further flight and the inner wall of the housing. Each conveying element has at least two conveying sections rotated through an angle, wherein each conveying section has an axial length corresponding to at most the outer diameter of the conveying element.

15 Claims, 8 Drawing Sheets

(56) References Cited

FOREIGN PATENT DOCUMENTS

| | | |
|---|---|---|
| DE | 102004010553 A1 | 9/2005 |
| DE | 102008016862 A1 | 10/2009 |
| DE | 102008029305 A1 | 12/2009 |
| EP | 0002131 | 11/1978 |
| EP | 0788867 | 8/1997 |
| EP | 0788868 A1 | 8/1997 |
| WO | 2009152910 A1 | 12/2009 |

OTHER PUBLICATIONS

International Search Report and Written Opinion for PCT/EP2011/001477 dated Aug. 12, 2011.

\* cited by examiner

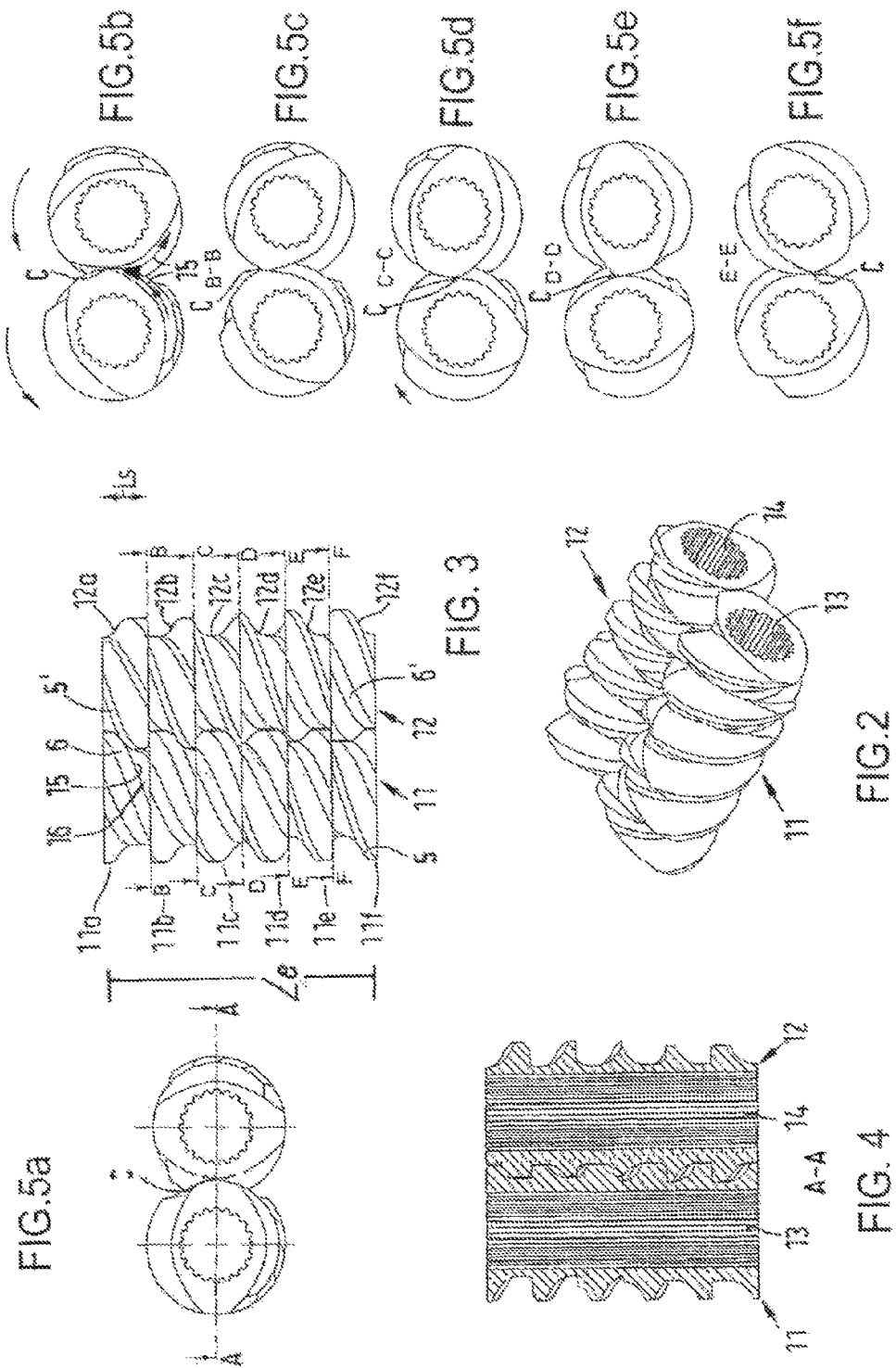

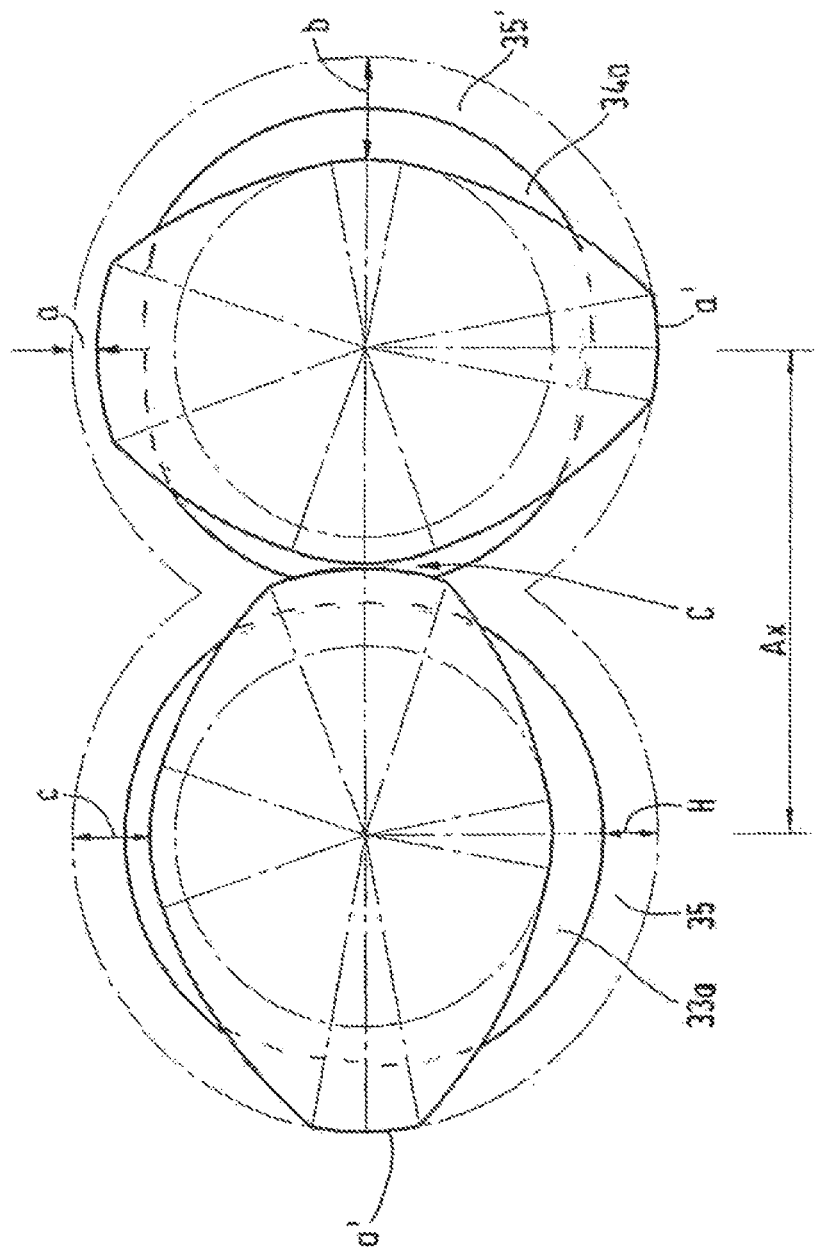

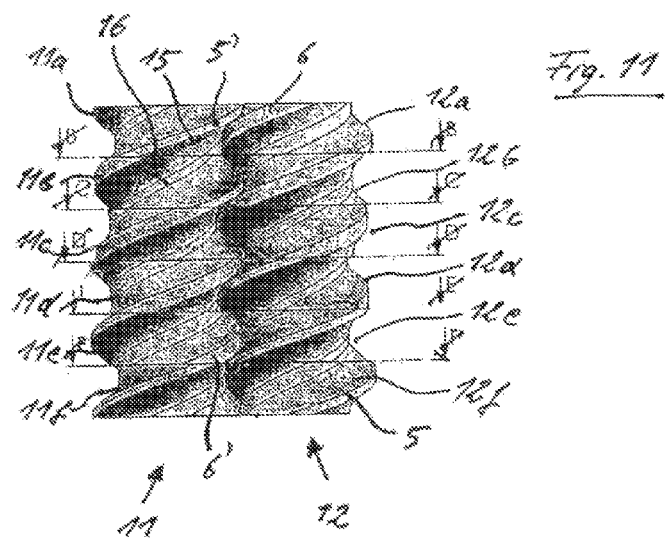
Fig. 11
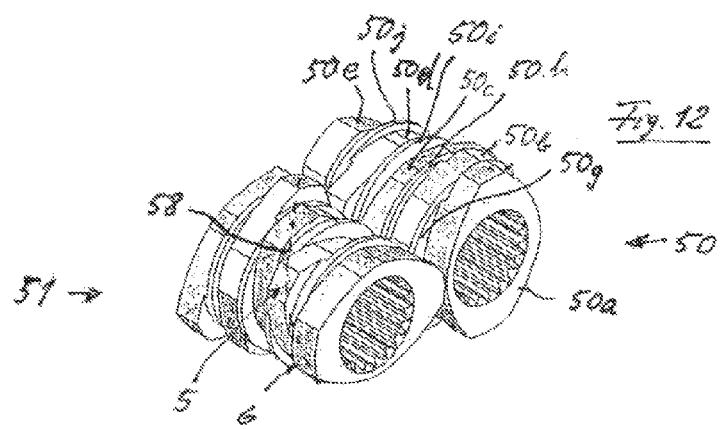
Fig. 12
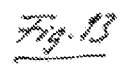
Fig. 13
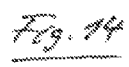
Fig. 14
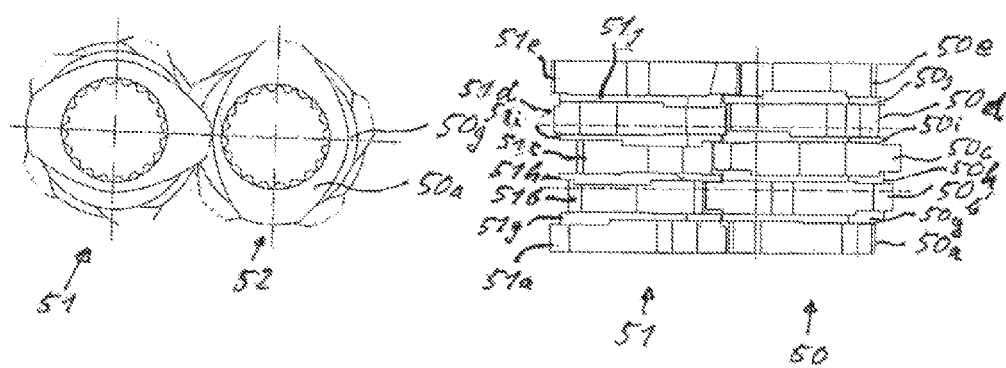

EXTRUDER

CROSS REFERENCE TO RELATED APPLICATIONS

This application is a U.S. National Stage Entry under 35 U.S.C. §371 of International Application No. PCT/EP2009/005162 filed on Jul. 16, 2009, the contents of which are incorporated by reference herein.

BACKGROUND OF THE INVENTION

1. Field of the Invention

The invention relates to a twin-shaft or multi-shaft extruder.

2. Description of Related Art

Twin-shaft or multi-shaft extruders having shafts which are capable of being driven in the same direction substantially comprise closely intermeshing shaft conveyors as well as kneading blocks as conveying elements. For the purpose of easy adaption of geometry and material to the different process tasks, appropriate components in the required variety are usually formed in such a way that they are pluggable onto the supporting shaft so as to rotate therewith.

In order to align the required flexibility with the high demands on efficiency and safety, geometric limitations are indispensable, such as only one or few element lengths and/or the same mounting position at the ends, whereby the necessary screw pitches, element types and/or overall lengths are substantially restricted. In order to achieve the required adaptability of the elements, only the end positions and/or lengths have to be observed so that the geometric conditions in between, such as the pitch and the offset angle, continuous or in steps, can freely be selected from a procedural point of view. In the product throughput, effectiveness and the kind of energy transfer from the conveyor structures to the product affect both the temperature and quality of the product. In order to wet solids in powder form with viscous material and disperse and/or disaggregate them therein, shear flows or, better still, elongational flows have to be generated in the highly viscous material.

EP 0 002 131 B1 discloses a self-cleaning type extruder including two shafts and a two-flight screw profile in which one comb of the screw has a small distance and the second one a great distance from the inner wall of the housing.

As a result, two flights separated by a comb at a great distance from the wall of the housing are formed between two adjacent combs at a small distance from the inner wall of the housing. Thus, the product may freely flow from one flight into the other one, whereby it flows into the first flight until the latter is filled, whereas the second flight is filled partly at most. Hence, the product is subjected to the necessary homogenous treatment only in the first flight so that the product is treated unequally, since the exchange of material from the first flight to the second flight is insignificant.

However, the homogenization and dispersion of the solids in a viscous matrix, which can be achieved by means of the known extruders, is still unsatisfactory. This particularly applies to solids with a particle size in the micrometer (μm) range.

BRIEF SUMMARY OF THE INVENTION

It is the object of the invention to provide an unrestrictedly self-cleaning multi-shaft extruder by which it is possible to improve the product quality significantly and effectively.

According to the invention, at least two-flight conveying elements are used, consisting of circular arcs in profile section, i.e. the cross-section perpendicular to the shaft, with intermeshing conveying elements substantially stripping each other closely over the entire circumference. In addition to two-flight conveying elements, three-flight conveying elements are particularly used.

In this case, the comb of the first flight strips the inner wall of the housing at a small clearance, whereas there is a greater distance between the comb of the at least one further flight and the inner wall of the housing. Each conveying element has at least two conveying sections offset to each other continuously or in steps, with each conveying section preferably having an axial length corresponding to at most the total, preferably at most half the outer diameter of the conveying element, hence the total and/or half the inner diameter of the inner wall of the housing. The axial length of the conveying sections of the intermeshing conveying elements is preferably equal, but it can also vary.

Thus, each conveying section has a correspondingly large flight depth at an angle of 90° in case of two flights, and a correspondingly small flight depth at an angle of 60° in case of three flights. That is to say in the conveying element according to the invention, a first comb at a small clearance from the inner wall of the housing is followed by a second comb at a greater distance from the inner wall of the housing, and at an angle thereto, a correspondingly large flight depth as well as a small flight depth at a maximum distance of 1 Da or ½ Da (Da=outer diameter of the conveying element or inner diameter of the inner wall of the housing).

This means that an extensive exchange of material is possible across all feed channels in the circumferential direction from channel to channel involving multiplied flow divisions, with the material exchange being carried out radially as well as axially in the same way with different and varying flight depths and corresponding comb/housing clearances. Thus, the filling degree is equal in all channels. Due to the permanent geometric chicane in the alternation of comb and flight in rapid succession in the circumferential and axial direction, a particularly high density of elongational flows is produced. Since this takes place without the undesirable decrease of viscosity in all feed channels in the entire cross-section and over the entire length of the conveying element, a more effective and more rapid mixing is achieved and a significantly higher product quality with a more uniform homogenization. This is substantially attributed to two sharp deflections at the transition of the product from one supporting shaft to the next one in case of the twin-shaft extruder, and, in particular, 12 deflections in a six-shaft extruder as well as 24 deflections in a twelve-shaft extruder, which cause a further intensification of the effective forces in the product.

By means of viscosity of the continuous phase, tensile and bending forces are thus repeatedly exerted on the fatigue strength of the agglomerates of solids, which results in the fatigue fracture of the latter. According to the invention, an effective homogenization and dispersion of the solid is achieved, that is to say even in case of solid particles having a particle size in the μm range, hence less than 100 μm, in particular less than 10 μm.

By means of the conveying element according to the invention, the product is thus subjected to constantly varying flight depths and material velocities and hence elongation processes over a very short length.

According to the invention, an extensive exchange of material is achieved as a result of the great distance of the one comb from the inner wall of the housing, whereas at the comb stripping on the inner wall, only a minor exchange of material takes place, but the greatest dispersing effect is achieved due to maximum strain. Since according to the invention, said comb consists of short sections, the product is subjected to extreme strain only in small areas, however, which is why the temperature of the product may be kept altogether low with the consequence that even in the extremely strained areas, the product cannot be damaged and is thus treated altogether gently.

Therefore, the extruder according to the invention is also suited for the processing of sensitive products, for example the reprocessing of polyethylene terephthalate (PET).

Preferably, the conveying element according to the invention is formed in one piece, for example by milling of a corresponding piece of metal. Whereas according to the invention, the comb of the first flight substantially strips the inner wall of the housing closely, thus has only a small clearance of, for example, less than 1 millimeter (mm), preferably less than 0.5 mm, with an outer diameter Da of the conveying element of less than 100 mm, the distance of the comb of the at least one further flight of the screw element from the inner wall of the housing preferably corresponds to at most half the flight depth of the first flight, preferably, however, more than 1 mm.

Preferably, the pitch of the combs of the conveying elements ranges from ⅓ Da to infinite. That is to say the conveying element according to the invention can, for example, also be formed as a kneading block.

The flight pitch of the conveying element can differ from conveying section to conveying section. In addition, the ratio of the outer diameter Da to the inner or core diameter Di may vary from conveying section to conveying section.

Preferably, the axial length of the conveying element is at least 1 Da and should not exceed 4 Da, because in case of a length of more than 4 Da, it is difficult to handle, for example difficult to detach from the shaft.

The extruder according to the invention has at least two, preferably at least three, axially parallel shafts which are capable of being driven in the same direction. The shafts may be arranged on a straight, plane surface. Instead, shafts arranged along a circle or a circular arc can also be provided in the cavity of the housing of the extruder, wherein both on the radially internal and external side of the cavity, the housing of the extruder is equipped with concave circular segments parallel to the extruder axis, in which the screw elements are substantially guided closely, as described in EP-B-0788867, for example.

In this case, at least six shafts are preferably arranged at the same central angle distance along a circle.

By means of the conveying elements according to the invention, the material can thus pass through the shaft rim from one side of the cavity to the other side. In case of six shafts arranged at the same central angle distance along a circle, for example, the homogenization is substantially increased by twelve deflections of the product.

The flight depth of the first comb of the conveying element according to the invention may be smaller than the flight depth of the remaining standard conveying elements of the extruder, that is to say the conveying elements the combs of which are substantially in close contact with the inner wall of the housing. Thus, the conveying element in the material filling zone of the extruder may, for example, have a particularly large flight depth. The ratio of the outer diameter Da of the conveying elements to the inner diameter Di, for example, may range from 1.25 to 1.85. Preferably, the ratio of the outer diameter of the conveying element to the inner diameter has its maximum in the filling zone of the extruder.

The shaft and the at least one conveying element according to the invention, which supports the shaft, preferably form a single component. Due to the fact that the shaft and the conveying element are formed in one piece, a significantly higher torque can be transmitted. For example, the shaft, including the driving shaft, as well as the conveying element in the area of the filling zone, including the fusing zone, may consist of a single component.

The filling zone can be followed by a zone with a conveying element having a smaller ratio of the outer diameter to the inner diameter, which, in turn, can be followed by a conveying element having a larger ratio of the outer diameter to the inner diameter etc.

Between two conveying sections of the conveying element, a concentric annular section may be provided, which on the circumference, has a short axial length of at most ⅕ of the axial length of one conveying section and/or the shortest conveying section in case of conveying sections of different length, and which has a free passage height to the inner wall of the housing being equal to or larger than half the pitch depth.

The annular section may be circular, but it may also deviate from the circular shape. Due to the annular section between two conveying sections of the conveying element, the conveying speed is reduced in the axial direction and hence the dispersing effect is increased.

The conveying sections of the intermeshing conveying elements of the extruder according to the invention may consist of screw sections.

Preferably, the screw sections are offset at an angle such that the comb of each flight of the conveying element is formed by adjoining alternating comb sections substantially stripping the inner wall of the housing closely as well as comb sections having a distance from the inner wall of the housing.

That is to say the conveying element is a screw element, wherein each comb of the screw element alternately consists of a comb section stripping on the wall of the housing and a comb section having a great distance from the wall of the housing.

In screw sections, the comb stripping on the inner wall of the housing, i.e. having a small distance from the inner wall of the housing, has a small width, and the comb being arranged at a distance from the inner wall of the housing has a large width.

Accordingly, in a conveying element the screw sections of which are offset at an angle such that the comb of each flight of the conveying element is formed by adjoining comb sections substantially stripping the inner wall of the housing closely in alternating sequence and/or having a distance from the inner wall of the housing, narrow and wide combs alternate along the comb of each flight.

Instead of being formed as screw sections, however, the conveying sections of the conveying element of the extruder according to the invention can also be formed in any other way. Thus, the intermeshing conveying elements may especially be formed by kneading blocks, that is to say the conveying sections can be formed by the cam disks of the kneading blocks offset at an angle.

Such kneading blocks are used for mixing and kneading the product. Due to the cam disks offset at an angle, however, they also have a conveying effect.

The cam disks have a cross-section which is perpendicular to the shafts and corresponds to the cross-section through a screw element and/or a screw section.

This means that like the screw section, each cam disk also has a comb substantially stripping the inner wall of the housing closely and at least one further comb at a distance from the inner wall of the housing.

The combs of the cam disks of the kneading block stripping closely on the inner wall of the housing form the first flight, and the combs of the cam disk of the kneading block arranged at a distance from the inner wall of the housing form the at least one further flight. Preferably, the kneading blocks are likewise formed in one piece, for example by milling of a piece of metal.

As described above, annular sections can also be provided between two cam disks of the kneading block in order to reduce the flow of material in the axial direction and thus increase the dispersing effect.

According to the invention, the intermeshing conveying elements strip each other at a small clearance over the entire circumference. At the same time, the comb of the first flight closely strips the inner wall of the housing. In addition, the comb of the first flight strips the core and the flanks of the corresponding conveying element. That is to say said comb of the respective conveying section closely strips the core and the flanks of the corresponding conveying section with which it intermeshes. This applies to screw elements as conveying elements as well as kneading blocks as conveying elements. If kneading blocks comprise said concentric annular sections, however, they carry out the stripping of the flanks.

BRIEF DESCRIPTION OF THE DRAWINGS

The invention is exemplified in more detail below based on the enclosed drawings, in which:

FIG. 1a shows a cross-section through a first conveying section and FIG. 1b a second conveying section of a conveying element rotated through 180° in relation to FIG. 1a;

FIGS. 2, 3 and 4 show a perspective view and/or a lateral view and/or a longitudinal section of two intermeshing conveying elements;

FIGS. 5a to 5f each show a section along the lines A-A, B-B, C-C, D-D, E-E and F-F according to FIG. 3;

FIGS. 7 and 8 show a lateral view and/or a section of two intermeshing conveying elements of a twin-shaft extruder having annular sections;

FIG. 11 shows a perspective view of two intermeshing conveying elements of a variant of the conveying element according to FIGS. 2 to 4;

FIGS. 12 to 14 show a perspective view and/or a front view and/or a lateral view of two intermeshing kneading blocks.

DETAILED DESCRIPTION OF THE INVENTION

Figure 1A:
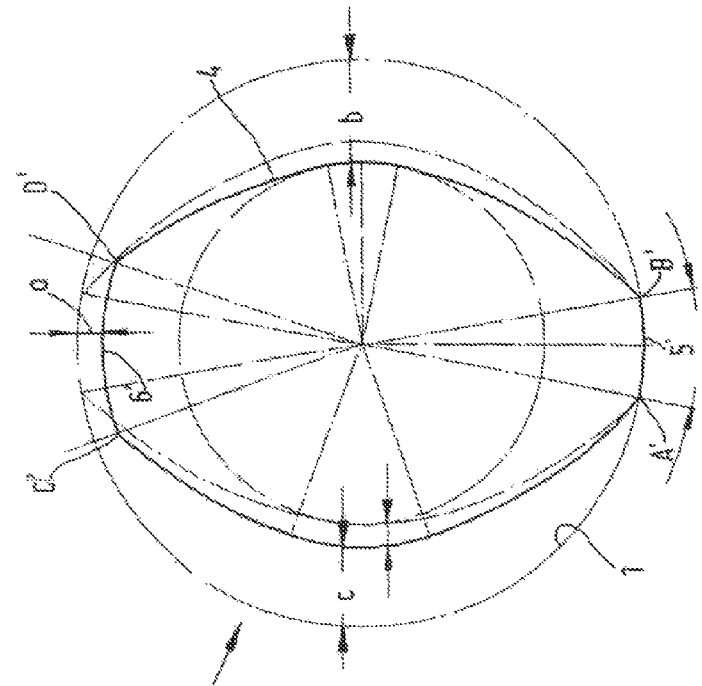
Figure 1B:
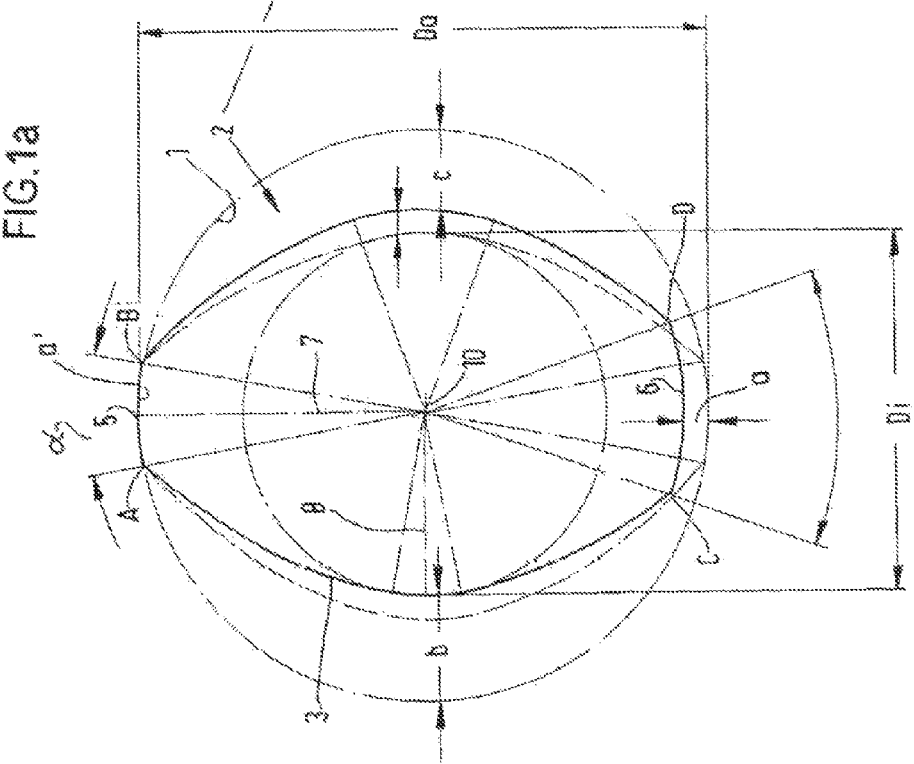

According to FIGS. 1a and 1b, the housing of the extruder has a cylindrical inner wall 1. A two-flight conveying element 2 is used, which according to FIGS. 1a and 1b, consists of two conveying sections 3 and 4, namely the first conveying sections 3 and the second further conveying sections 4 rotated through 180° in relation to the first conveying sections 3.

The profile section, i.e. the cross-section perpendicular to the shaft of the conveying sections 3, 4 consists of circular arcs. The circular arc A-B in Figure 1a and/or the circular arc A'-B' in FIG. 1b represent the comb 5, 5' of the first flight, which is substantially in close contact with the inner wall 1 of the housing, that is to say at a small clearance a', whereas the circular arc C-D and/or C'-D' represents the comb 6, 6' of the second flight, which is arranged at a distance a from the inner wall 1. According to FIG. 1a, the flight with the comb 5 has a large flight depth b and the second flight with the comb 6 has a small flight depth c. The long circular arcs A-C and B-D and/or A'-C' and B'-D' each consist of three circular arcs, namely in the centre of a circular arc with a diameter which corresponds to the core diameter Di being followed on both sides by a circular arc with a diameter the radius of which corresponds to the axial distance Ax of the two conveying elements.

The second conveying section 4 according to FIG. 1b, which axially follows the conveying section 3, can be formed by reflection of the first conveying section 3 about an axis 7 or the axis 8 rotated through 90° in relation thereto, or may be achieved by rotation through 180°.

The axis 7 is formed by the plane intersecting the shaft axis 10 and the centre of the comb 5; the axis 8 is formed by the plane centrally intersecting the circular arcs AB and BC and the shaft axis 10.

The outer diameter Da of the conveying element 2 may, for example, be 10 to 50 mm, the inner diameter Di, for example, 7 to 30 mm, the distance a, for example, 1 to 3 mm. The comb 5 may include an angle α ranging, for example, from 15° to 25°.

That is to say the second comb 6' of the second conveying section 4 being formed by the circular arc C'-D' and having the distance a from the inner wall 1 of the housing is offset by 180° in relation to the second comb 6 of the first conveying section 3, ditto the large flight depth b and the small flight depth c.

As exemplified by the conveying elements 31, 32 in FIG. 8, the intermeshing conveying elements have an axial distance Ax and strip each other over the entire circumference (FIGS. 5a, 8, 9, 13 and 16).

As can particularly be seen from FIGS. 1a, 1b and 3, the comb 5' of the first flight of the one conveying element 12 substantially strips the inner wall 1 of the housing as well as the flank 15 and the core 16 of the conveying element 11 intermeshing therewith closely.

According to FIG. 2, the one-piece conveying elements 11, 12 of a twin-shaft extruder are provided with internal teeth 13, 14 in order to plug them onto two axially parallel shafts rotating in the same direction (not illustrated) so as to rotate therewith.

Each conveying element 11, 12 has an axial length Le of, for example, 2.5 Da, preferably at most 4 Da, and consists of six conveying sections 11a to 11f and 12a to 12f. The conveying sections 11a to 11f and 12a to 12f of each conveying element 11 and/or 12 are arranged progressively in steps and are offset in relation to each other by the same angle, for example 36°. Each conveying section 11a to 11f and 12a to 12f has two flights. Intermeshing conveying sections 11a to 11f and 12a to 12f are substantially in close contact at a point C, that is to say at a small clearance of, for example, less than 1 mm, as shown in FIGS. 5a to 5f.

As exemplified by the conveying elements 111 and 121, the comb 5 and/or 5' of the first flight of each conveying section according to FIG. 1a is formed such that it is in contact with the inner wall 1 of the housing, whereas there is a greater distance a between the comb 6, 6' and the inner wall 1 of the housing. The axial lengths Ls of the conveying sections 11a to 11f and 12a to 12f each correspond to approximately ⅓ of the diameter Da of the conveying element 11, 12 and/or the diameter of the inner wall 1 of the housing (FIGS. 1a and 1b). Due to the constantly varying flight depth in accordance with the combs 5, 6 and 5', 6', the product is subjected to continuous tensile stress. As illustrated by the arrows 15 in FIG. 5b, there is also a sharp deflection of the product in the area of the stripping points C.

Figure 6:
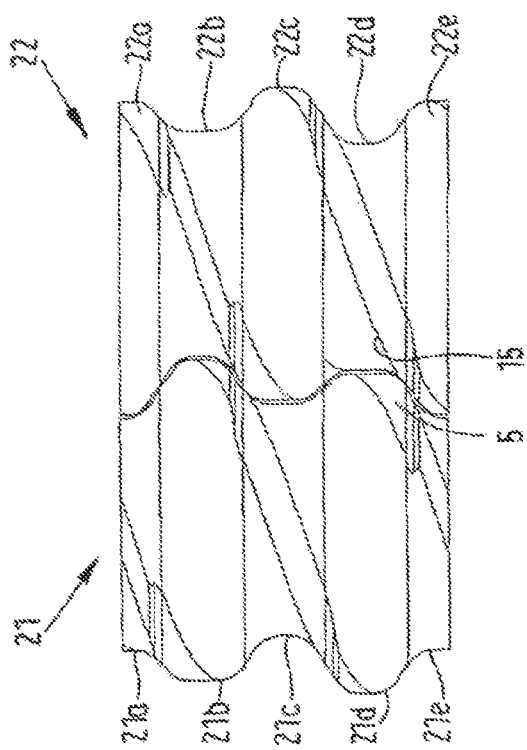
FIG. 6 shows a lateral view of two intermeshing conveying elements of a twin-shaft extruder.

In case of the twin screw according to FIG. 6, the conveying elements 21, 22 comprise the conveying sections 21a to 21e and/or 22a to 22e, which are rotated through 180° in relation to each other, that is to say offset an angle of 180°.

Figure 7:
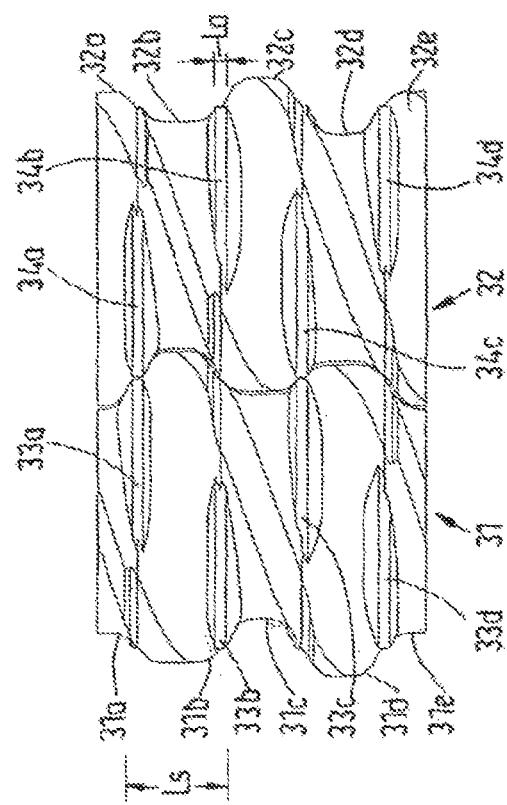

According to FIGS. 7 and 8, the conveying elements 31, 32 comprise conveying sections 31a to 31d and/or 32a to 32d, each having a concentric annular section 33a to 33d and/or 34a to 34d. The conveying sections 31a to 31d and 32a to 32d are rotated through 180°. The dimension H of the annular gap 35, 35' between the rings 33a and/or 34a and the inner wall 1 of the housing ranges from ¼ to ¾ of the flight depth (b) and is, for example, half the flight depth (FIG. 8).

On the circumference, the axial length La of the rings 33a to 33d, 34a to 34d is not more than ⅕ of the length Ls of the conveying sections 31a to 31d, 32a to 32d. The rings 33a to 33d and 34a to 34d do not have to be exactly centric or circular. It is rather sufficient if they substantially form centric circular sections.

Figure 9:
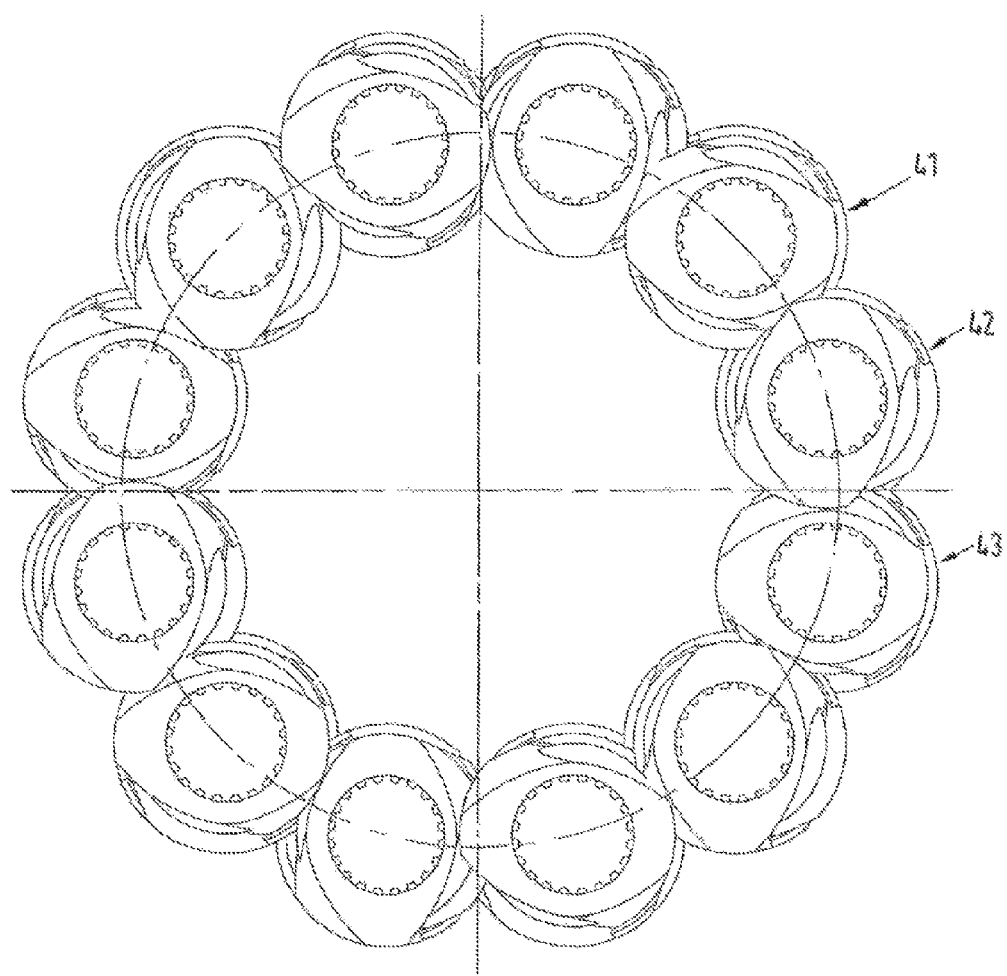
FIGS. 9 and 10 show a lateral view and/or a section of a multiple-shaft extruder having shafts arranged along a circle.
Figure 10:
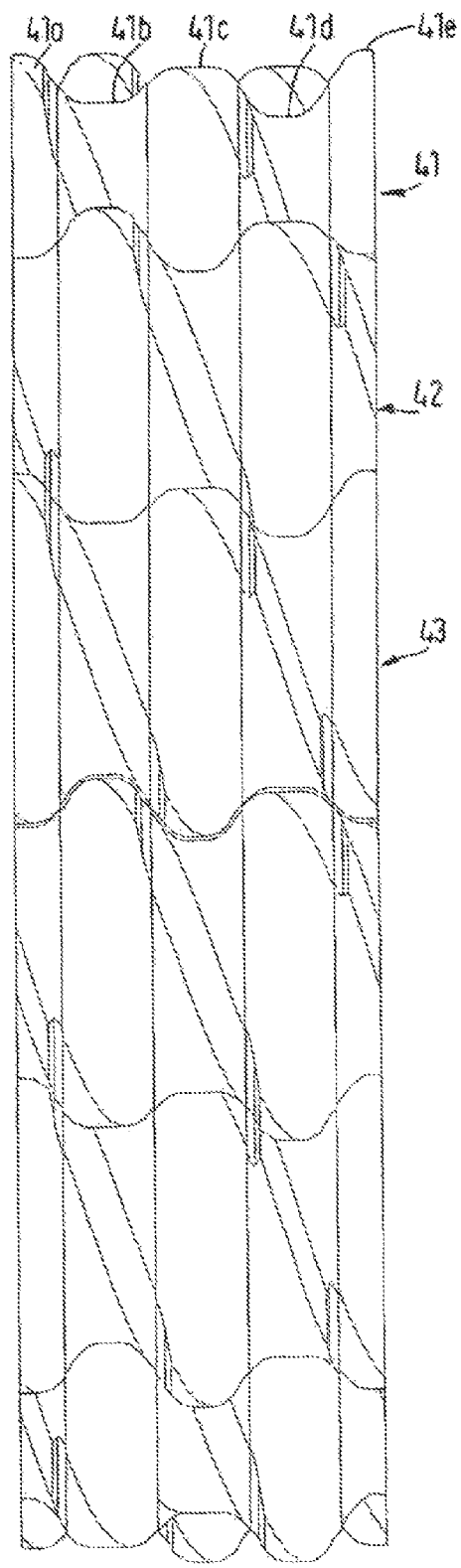

In case of the extruder according to FIGS. 9 and 10, the conveying elements 41, 42, 43 . . . are mounted on axially parallel shafts being arranged along a circle so as to rotate therewith, with the conveying elements 41, 42, 43 . . . stripping each other over the entire circumference. The conveying elements 41, 42, 43 consist of conveying sections 41a to 41e having a profile offset by 180°.

As in FIGS. 2 to 5, the two conveying elements 11 and 12 according to FIG. 11 also consist of conveying elements 11a to 11f and 12a to 12f, which are formed by screw sections.

According to FIG. 11, the screw sections 11a to 11f of the conveying element 11 and the screw sections 12a to 12f of the conveying element 12 are offset at an angle such that the comb 5', 6 of each flight of the conveying elements 11 and 12 is formed by adjoining comb sections 5' substantially stripping the inner wall 1 of the housing closely, and comb sections 6 being arranged at a distance (a) from the wall of the housing (FIGS. 1a and 1b), with the comb sections 5' and the comb sections 6 alternating.

Thus, the conveying elements 11 and 12 according to FIG. 11 each form screw elements.

As can be seen inter alia from FIG. 11, the comb 5, 5' in the screw elements 11 and 12 substantially stripping on the inner wall of the housing closely is narrower than the comb 6, 6' so that narrow sections 5' alternate with wide sections 6.

Whereas FIGS. 2 to 7 and 9 to 11 relate to screw elements as conveying elements and/or conveying elements with screw sections of finite pitch, conveying elements with screw sections of infinite pitch as conveying elements of intermeshing kneading blocks 50, 51 and/or 52, 53 are provided according to FIGS. 12 to 14 and FIGS. 15 to 17 in order to achieve a high degree of specific energy input.

In this case, the kneading blocks 50, 51 according to FIGS. 12 to 14 consist of cam disks 50a to 50e and 51 to 51e offset at an angle.

The cam disks 50a to 50e, 51a to 51e have a cross-section which is perpendicular to the shafts and which corresponds to the cross-section through the conveying element 2 according to FIGS. 1a and 1b.

That is to say according to FIGS. 1a and 1b, each cam disk 50a to 50e and 51a to 51e has a narrow comb 5, 5' substantially stripping the inner wall 1 of the housing closely and a further wide comb 6, 6' at a distance from the inner wall of the housing.

In this case, flights having a conveying effect are likewise formed, as illustrated by the flight 58 in FIG. 12 (dashed line). The flights of each kneading block 50, 51 are formed by alternating wide combs 6, 6' and narrow combs 5, 5', as shown by the flight 58 according to FIG. 12.

According to FIG. 7, annular sections 50g to 50j and/or 51g to 51j concentric to the shafts are provided between the conveying sections or cam shafts 50a to 50f and 51a to 51f also in the kneading blocks in accordance with FIGS. 12 to 14.

Since the gap between the wide comb 6 and the inner wall 1 of the housing enables an extensive exchange of material, whereas there is only a small clearance between the comb 5, the cam disks 51a and the cam disk 50a, that is to say on the one hand, the product is highly strained, but on the other hand, it is intensively dispersed. As the strain only occurs in this small area, an altogether gentle treatment of the product is achieved.

Figure 15:
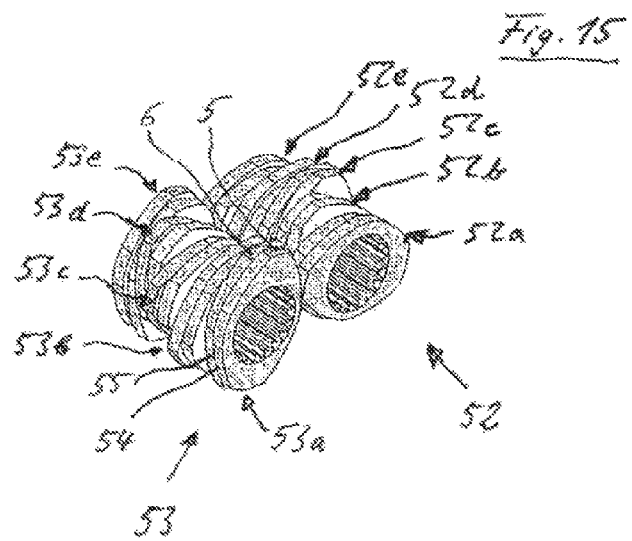
FIGS. 15 to 17 show a perspective view and/or a front view and/or a lateral view of a variant of the kneading blocks according to FIGS. 12 to 14.
Figure 16:
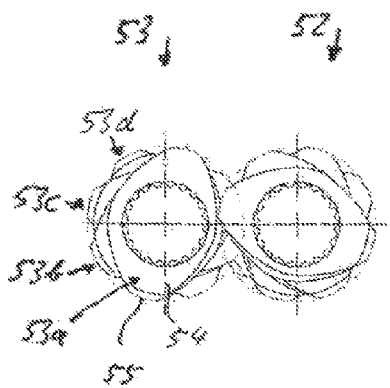
Figure 17:
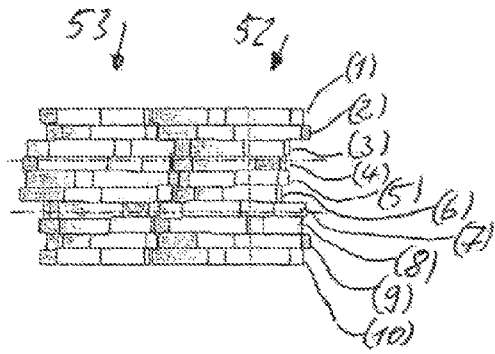

According to FIGS. 15 to 17, each cam disk 52a to 52e and 53a to 53e of the intermeshing kneading blocks 52, 53 consists of two dividing plates, as illustrated by the dividing plates 54, 55 of the cam disk 53a.

The kneading blocks 52, 53 according to FIGS. 15 to 17 each consist of five twin disks 52a to 52e and/or 53a to 53e. As a result, there are altogether ten dividing plates 52, which are identified by the numerals (1) to (10) as regards the kneading block 52 in FIG. 17. The odd-numbered dividing plates (1), (3), (5), (7), (9) are rotated through 180° in relation to the even-numbered dividing plates (2), (4), (6), (8), (10), and the even-numbered dividing plates are rotated through 225° (180° plus 45°) in relation to the odd-numbered dividing plates.

As shown by the dividing plates 54, 55, the comb 56 of the one dividing plate 54 substantially strips on the inner wall of the housing closely, whereas the adjacent comb 55 of the adjacent dividing plate 55 of the cam disk 53a has a distance from the inner wall 1 of the housing corresponding to the distance a according to FIGS. 1a and 1b.

The invention claimed is:

1. An extruder comprising:
    a housing having an inner wall, and
    at least two axially parallel shafts, the shafts being driven in a common direction and provided with at least two flight conveying elements, the at least two flight conveying elements intermeshing in a cross-section perpendicular to the shafts so as to strip each other at an axial distance (Ax) with a small clearance over an entire circumference, the at least two axially parallel shafts being in the housing at a distance (a) between a comb of at least one further flight and the inner wall of the housing, and
    wherein each conveying element has at least two conveying sections rotated through an angle, wherein each conveying section has an axial length (Ls) corresponding to at most ½ times an outer diameter (Da) of the conveying element;
    wherein the distance (a) is greater than a clearance distance (a') of a flight stripping the inner wall of the housing;
    wherein the flight stripping the inner wall of the housing has a flight depth (b) that is greater than a flight depth (c) associated with the at least one further flight; and
    wherein one conveying section is offset relative to the next conveying section by an angle of no greater than 360°/number of flights.

2. The extruder according to claim 1, wherein the distance (a) between the comb and the inner wall corresponds to at most half a flight depth (b) of a first flight.

3. The extruder according to claim 1, wherein the angle of offset from one conveying section to the next one is in steps.

4. The extruder according to claim 1, wherein, between two conveying sections, a concentric annular section is provided having a free passage height (H) to the inner wall of the housing which is equal to or larger than half the flight depth (b).

5. The extruder according to claim 1, wherein the distance (a) of the further comb from the inner wall of the housing vary within one conveying element.

6. The extruder according to claim 1, wherein the flight depth (b) of the at least two conveying sections varies.

7. The extruder according to claim 1, wherein the axial length (Ls) of the conveying elements corresponds to a maximum of four times the outer diameter (Da) of the conveying elements.

8. The extruder according to claim 1, wherein the at least two axially parallel shafts comprises at least six axially parallel shafts arranged along a circle at a common central angle.

9. The extruder according to claim 1, wherein the flight depth (b) of at least one flight of the at least one conveying element is smaller than the flight depth of the remaining conveying elements exclusively comprising flights with combs which are substantially in close contact with the inner wall of the housing.

10. The extruder according to claim 1, further comprising a ratio of the outer diameter (Da) of the conveying elements to an inner diameter (Di) of the conveying elements ranges from 1.25 to 2.3.

11. The extruder according to claim 10, wherein the ratio has a maximum in a filling zone of the extruder.

12. The extruder according to claim 1, wherein the intermeshing conveying elements are formed by screw sections offset at an angle as conveying sections.

13. The extruder according to claim 12, wherein the screw sections are offset at an angle such that the comb of each flight of the conveying element is formed by adjoining alternating comb sections substantially stripping the inner wall of the housing closely as well as comb sections having the distance (a) from the inner wall.

14. The extruder according to claim 1, wherein the intermeshing conveying elements are formed by kneading blocks, with the conveying elements offset at an angle forming cam disks of the kneading blocks.

15. The extruder according to claim 14, wherein each cam disk consists of at least two dividing plates, wherein the comb of the one dividing plate substantially strips the inner wall closely, whereas the adjacent comb of the adjacent dividing plate has the distance (a) from the inner wall.

* * * * *